(12) United States Patent
Goodson et al.

(10) Patent No.: US 8,978,034 B1
(45) Date of Patent: Mar. 10, 2015

(54) SYSTEM FOR DYNAMIC BATCHING AT VARYING GRANULARITIES USING MICRO-BATCHING TO ACHIEVE BOTH NEAR REAL-TIME AND BATCH PROCESSING CHARACTERISTICS

(71) Applicant: Natero Inc., Palo Alto, CA (US)

(72) Inventors: Garth Goodson, Fremont, CA (US); Craig Anthony Nigel Soules, Palo Alto, CA (US)

(73) Assignee: Natero, Inc., Palo Alto, CA (US)

( * ) Notice: Subject to any disclaimer, the term of this patent is extended or adjusted under 35 U.S.C. 154(b) by 223 days.

(21) Appl. No.: 13/843,301

(22) Filed: Mar. 15, 2013

(51) Int. Cl.
*G06F 9/46* (2006.01)

(52) U.S. Cl.
CPC .................................... *G06F 9/46* (2013.01)
USPC .......................................... 718/101; 718/106

(58) Field of Classification Search
CPC ...... G06F 9/466; G06F 9/4843; G06F 9/5038
See application file for complete search history.

(56) References Cited

U.S. PATENT DOCUMENTS

| | | | | |
|---|---|---|---|---|
| 5,826,104 | A * | 10/1998 | Rifkin ............................. | 710/15 |
| 7,206,805 | B1 * | 4/2007 | McLaughlin, Jr. ............. | 709/203 |
| 7,844,969 | B2 * | 11/2010 | Bigagli et al. ................. | 718/103 |
| 7,962,227 | B2 * | 6/2011 | Worek et al. ................... | 700/16 |
| 8,402,465 | B2 * | 3/2013 | Kohnke .......................... | 718/102 |
| 8,719,769 | B2 * | 5/2014 | Castellanos et al. .......... | 717/104 |
| 2010/0122254 | A1 * | 5/2010 | Karo .............................. | 718/101 |
| 2010/0262975 | A1 * | 10/2010 | Reysa et al. .................... | 718/105 |

OTHER PUBLICATIONS

Arpaci-Dusseau, et al., "Cluster I/O with River: Making the Fast Case Common", paper presented at IOPADS '99, May 1999, pp. 1-13.
Bruckner, et al., "Striving Towards Near Real-Time Data Integration for Data Warehouses", paper, DaWaK 2002, pp. 317-326.
Davidson, et al., "Enabling Privacy in Provenance-Aware Workflow Systems", $5^{th}$ Biennial Conf. on Innovative Data Systems Research, 2011, pp. 215-220.
Muniswamy-Reddy, et al., "Provenance for the Cloud", $8^{th}$ USENIX Conf. on File and Storage Technologies (FAST '10), Feb. 2010, pp. 1-14.
Olston, et al., "Nova: Continuous Pig/Hadoop Workflows", SIGMOD '11, Jun. 12-16, 2011, pp. 1-10.
Dunning, Ted, "Real-Time and Long-Time: Fun with Hadoop + Storm", Power Point Presentation, Mar. 29, 2012, pp. 1-31.

* cited by examiner

*Primary Examiner* — Van Nguyen
(74) *Attorney, Agent, or Firm* — Pillsbury Winthrop Shaw Pittman LLP

(57) ABSTRACT

This disclosure relates generally to automated workflow for data management, and specifically to efficient data manipulation and information extraction techniques used by a versatile data analytics platform. The information extraction techniques include micro-batching and provenance tracking, as well as integration of provenance-driven policies to improve the efficacy of the analytics. Embodiments disclosed here integrate the concept of real-time or near-real-time data stream processing and event/batch processing into one data processing layer, allowing a single processing definition to be applied at different granularities.

22 Claims, 7 Drawing Sheets

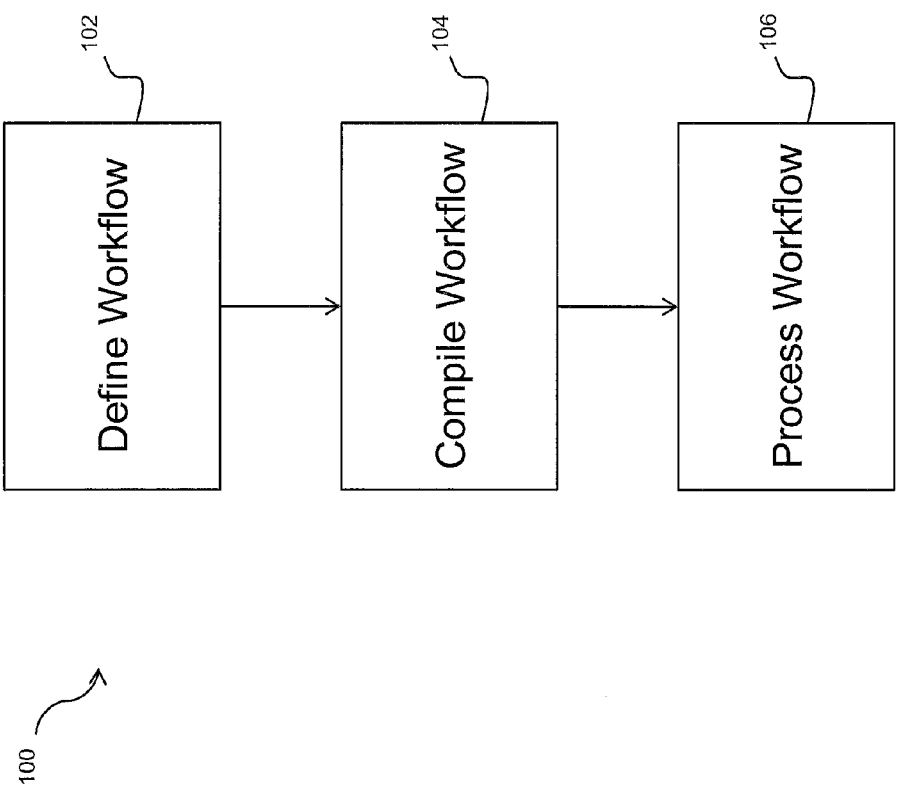

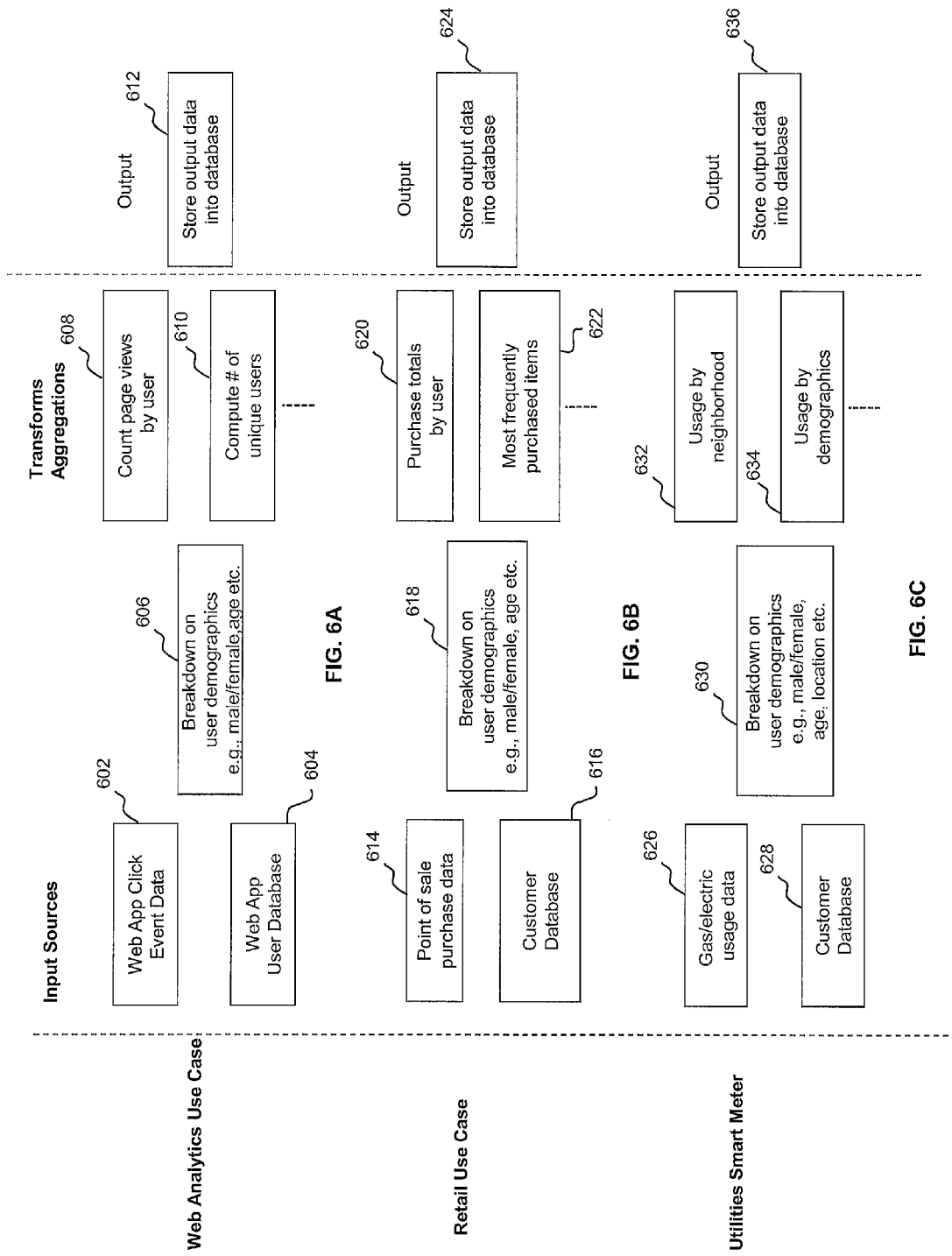

SYSTEM FOR DYNAMIC BATCHING AT VARYING GRANULARITIES USING MICRO-BATCHING TO ACHIEVE BOTH NEAR REAL-TIME AND BATCH PROCESSING CHARACTERISTICS

FIELD

This disclosure relates generally to automated workflow for data management, and specifically to efficient data manipulation and information extraction techniques, including micro-batching, used by a versatile data analytics platform.

BACKGROUND

Harnessing useful information and value efficiently and cost-effectively from processing already available data (stored or live feed) is fast becoming a key growth strategy for organizations having various sizes and end goals. Especially for large business enterprises having access to huge amounts of data ("Big Data"), data analytics is emerging to be one of the most important actionable considerations for marketing and current/future business development.

Data can be processed in real time, as the data stream becomes available, or data can be processed in batches (i.e. as an event). Traditionally, real-time processing and batch processing have had very different processing goals, resulting in very different processing systems and outcomes. Traditional stream-processing systems focus on a per-event processing framework (e.g., Twitter Storm, Berkeley River etc.). The assumption that events are not batched allows for simplifying decisions about how and when to perform processing. However, this assumption does not work well with larger batch processing systems (e.g., Hadoop Map-Reduce or data warehousing systems). Therefore, a key disadvantage of existing methods is that users have to maintain two different systems for processing real-time and/or near-real-time data and batch data and devise systems for integrating them manually or semi-manually.

Existing event/batch processing systems (e.g., data warehouses, Hadoop) offer minimal or zero support for managing the data being processed. Examples of missing management features include, but are not limited to, data retention and expiration, inherited security, and access auditing. The difficulty these systems often face is that they separate the concepts of data storage and management from the data processing layer. In other words, data passing through storage and management layers lose the inherent provenance and associated management policy.

There exists a handful of systems for tracking data provenance (e.g., Harvard PASS), however, these systems tend to be storage-centric, and therefore, may not be the most suitable for real-time processing.

Prior methods typically either try to manipulate the data through the processing layer using some kind of opaque cookie, or try to determine data origins using post-hoc analysis of processing behavior. The disadvantage of these approaches is a loss of provenance accuracy, as a trade-off for dealing with arbitrary computations. Therefore, what is needed is a completely accurate picture of data provenance, enabling a wide array of data management features. The system may focus on a more limited set of data processing computations, but techniques are required for increasing the overall efficiency of the data processing workflow management.

SUMMARY

Methods, apparatuses, and systems are disclosed for providing a robust workflow and data management platform. Data can be semi-structured, structured, unstructured. Data may be characterized by volume, frequency, type or other system-defined/user-determined criteria. Micro-batching and data provenance tracking are exemplary intelligent data analytics techniques that are utilized to drive data processing workflow management policies dynamically, as new insight becomes available progressively during the processing of stored and/or streaming data with configurable processing granularity.

The systems disclosed here integrate the concept of real-time or near-real-time processing and event/batch processing (including micro-batching) into one data processing layer, allowing a single processing definition to be applied at different granularities. In other words, the data management platform bridges the gap between real-time processing systems and batch processing systems.

One of the novelties of the present systems lies in that the design of the processing layer integrates data storage and provenance, resulting in simplifying the user experience and removing the hurdle of tracking management policy through a separate processing layer. The provenance tracking method can run on top of the underlying data processing/management workflow, and contributes in improving the workflow.

Specifically, this disclosure described a system for combining near-real-time data and batch data to be processed by a single data processing layer, the system comprising: an event collector module that, when executed on a computer, collects incoming event data in real-time; a hierarchical processing layer executed in the computer's processing environment, the processing layer comprising a plurality of processing sub-layers, each processing sub-layer configured to process one or more data micro-batches stored at respective corresponding levels of temporal granularity; a processing daemon executed in the computer's processing environment, the processing daemon configured to apply a single processing definition to the data micro-batches at the plurality of processing sub-layers, generating and storing resulting processed data micro-batches at the respective corresponding levels of temporal granularity; and, a data buffering control module sending commands to the computer's memory system, the data buffering control module configured to shift processed data micro-batches together to a next coarser level of temporal granularity, wherein the aggregation of the processed data micro-batches constitute batch data.

Methods and computer-program products corresponding the systems disclosed herein are also described.

BRIEF DESCRIPTION OF THE DRAWINGS

For a better understanding of at least certain embodiments, reference will be made to the following Detailed Description, which is to be read in conjunction with the accompanying drawings, wherein:

FIGS. 6A-6C depict examples of various applications of the provenance-driven workflow management system, according to embodiments of the present disclosure.

DETAILED DESCRIPTION

Figure 1B:
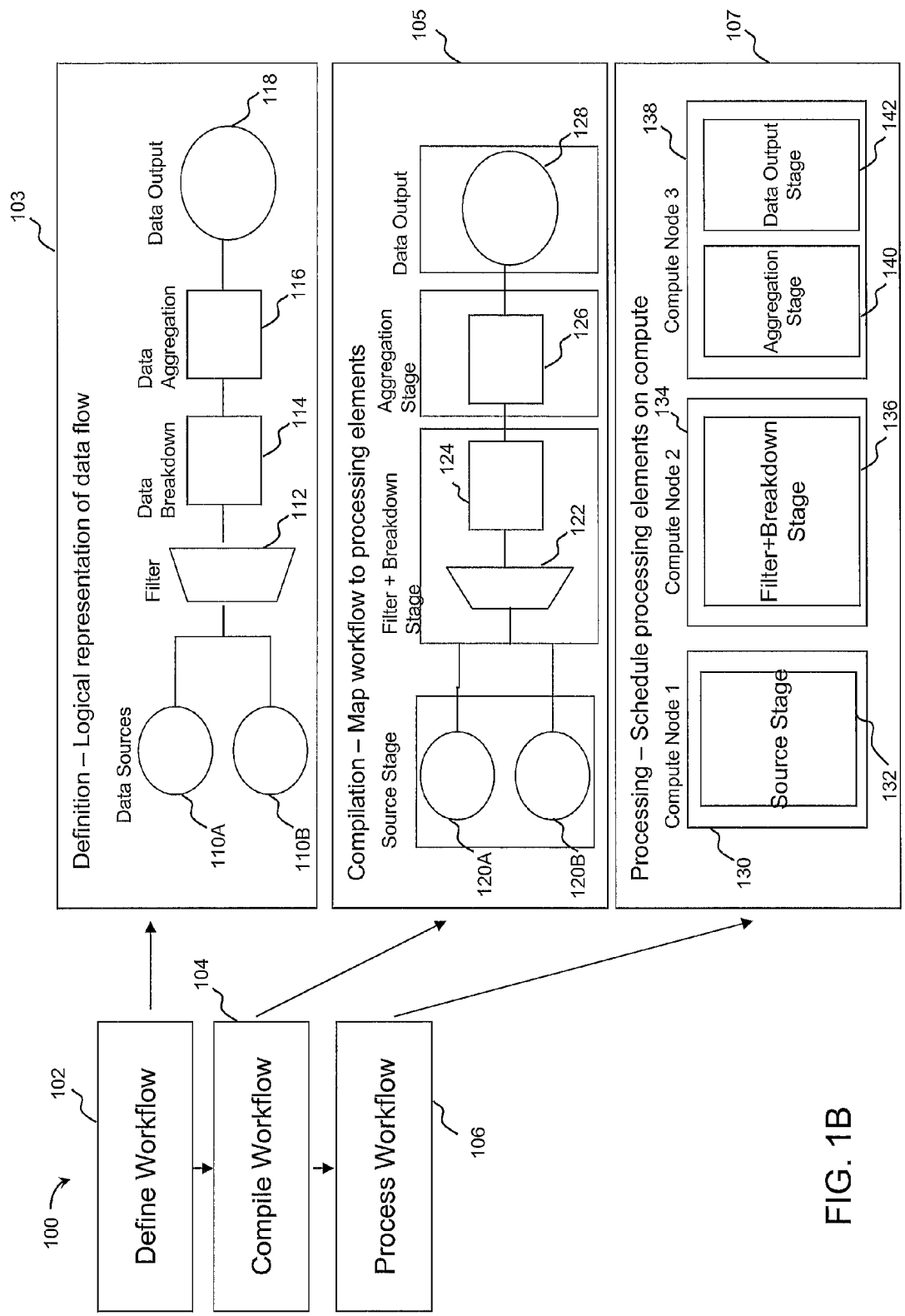
FIG. 1A depicts an exemplary workflow management flowchart, and, FIG. 1B depicts details of various stages of the workflow management flowchart, according to embodiments of the present disclosure.

Throughout the description, for the purposes of explanation, numerous specific details are set forth in order to provide a thorough understanding of the present disclosure. It will be apparent to one skilled in the art, however, that the present disclosure may be practiced without some of these specific details. In other instances, well-known structures and devices are shown in block diagram form to avoid obscuring the underlying principles of embodiments of the disclosure.

Embodiments of this disclosure describe techniques for implementing a near-real-time processing system for the workflow-processing environment described in the Workflow Overview document.

Embodiments of this disclosure bridge the gap between real-time processing systems and batch processing systems, allowing for a graduated view of time-series data, where a finite amount of more recent data can be explored at a fine-grained level, while older data is available for either batch processing and/or more granular exploration. In other words, the systems disclosed here integrate the concept of time and batching (including micro-batching) into a data processing layer, allowing a single processing definition to be applied at different granularities. The processing layer can be a hierarchical layer comprises a number of processing sub-layers. A processing daemon may run to apply the actual processing operation on micro-batches or batches of data. As a non-limiting example, an aggregation that calculates the sum of values can be applied both to micro-batches as well as to large historical batches of data. The system automatically maintains these various batch granularities to provide a scalable fully-integrated solution.

The data analytics platform of the present disclosure is designed to operate across a cluster of compute nodes within a single low-latency network topology. The system could be operated on a single compute node, or multiple nodes, depending on the required reliability, quality of service and availability of the system infrastructure.

Compared to existing event processing systems, one of the key differences of the present system is that the kinds of computations that can be performed can be controlled more tightly, allowing the system to hide the decisions of where and how to store the inputs and outputs of computations, as well as prevent the introduction of undesired "side-effects" on the data. The result is a white-box approach to data provenance, which allows for a complete understanding of the lineage and evolution of the data.

Furthermore, compared to other existing workflow management systems that capture data provenance, a key differentiating feature of the present system is that a compiler has been developed that can take standard event processing logic and output a workflow.

In summary, embodiments of the present disclosure are designed to integrate batch event processing in near-real time processing efficacy, while having the provision of running a provenance tracking functionality on top of the underlying batch event processing system.

Described below is an overview of a workflow management framework in which the embodiments of the present disclosure can be implemented. The flowchart 100 in FIG. 1A describes the three main stages of the overall workflow management framework, the stages being: definition of workflow (step 102), compilation of workflow (step 104) and processing of workflow (step 106). While embodiments of the present disclosure described herein are primarily concerned with the step 106, the scope of the disclosure pervades the other steps 102 and 104 as well. FIG. 1B shows the functional components used in the respective steps 102, 104 and 106.

In the processing system of the present disclosure, a workflow is generated to process data. A workflow comprises a 'definition' that describes how a stream of data is processed (step 102). The 'data stream' is comprised of a set of 'records.' These records are often temporally ordered (e.g., in an event stream). The workflow definition is then fed to a workflow compiler that takes the workflow definition and produces a description of processing stages that the data flows through (step 104). The processing stages transform the data according to the workflow definition. Through the entire workflow processing dataflow, metadata is collected about the data and how it is being processed, i.e. provenance is tracked. This metadata can be used to drive workflow improvement/data management policies, as shown in greater detail with examples in FIGS. 4 and 5. Metadata is part of the provenance tracking of data, as metadata reflects the lineage and evolution of the data.

A workflow definition (element 103) describes how the data is to be processed. The workflow definition may typically include the following details, as shown within element 103 in FIG. 1B:

Data source: Data may come from multiple sources, such as sources 110A and 110B. Rules specifying how to join the data coming from different sources into a single stream may be specified.

Input data format: Closely tied to the data source is the format of the incoming data. There are mainly two important aspects to the data format:

Structural: e.g., JSON, XML, CSV, etc.

Temporal: Data may be from a static source (i.e., it doesn't change very often like relational transaction or user demographic databases), or the data may be an event stream that comprises multiple records ordered by time.

Data transformations: There are a number of different data transformations that can be applied to the data. Examples of these include (but are not limited to):

Filters (element 112): these are used to filter out (exclude) data records containing specified fields or values.

Aggregations (element 116): These are used to describe how to aggregate multiple data records, e.g., counting how often a specific field/record appears, or summing the value of certain fields etc.

Transforms: These are similar to aggregations, and may be used to alter the physical properties of the data stream (e.g., sorting the data, or converting the format of specific fields).

Categorization/breakdowns: These are used to segment the data by specific data values, e.g., a breakdown on gender would result in an output dataset corresponding female records and male records. Breakdowns are typically performed prior to aggregations, and after filtering, so that there is one aggregated value per breakdown value (e.g., a count of purchases for both females and males). Element 114 shows data breakdown.

Roll-ups: These are used to collect related data into a single data object. E.g., a roll-up on session ID could collect together an ordered list of all pages visited across all of the events with the same session ID.

Outputs (element 118): Outputs specify where the result of the workflow should be placed. This can be a local or remote database, a file in a specific location, etc. As with data source format, the schema of the output data can also be specified (e.g., the names of the attributes containing a specific aggregation).

Periodicity: The periodicity specifies how often the workflow should run over the input data; e.g., a workflow can run every hour or day; or may be run only once, e.g., in the case of testing a new workflow or performing some exploratory work.

A workflow compiler (element 105) takes the workflow definition and translates it into a set of actions that the processing system knows how to perform on the data. Typically, a workflow requires multiple of these actions to fully process the data. The processing system has a set of processing elements that are able to perform a specific action or set of actions on the data. The workflow compiler understands the capability of each processing element and is able to map the workflow definition to these processing elements. In doing so, the compiler can also optimize the set of data transformations that run on each processing element; e.g., it may be able to run multiple counting aggregations at the same time or schedule multiple definitions on the same set of elements. The output of the compiler is a set of processing stages for the workflow.

A processing stage defines the set of actions to be performed over some portion of the data. A mapping of stage to processing element may also be included. A workflow is comprised of single or multiple stages (as output by the compiler). Each stage contains a description of the work to be performed by that stage, in addition to the processing element to be used for that stage. As a non-limiting example, a processing system may include the following types of stages:

Sources (elements 120A and 120B): A stage for retrieving data from a specific source. There may be one source stage per source type (i.e., that knows how to connect and read data from a specific source like a MySQL database or an Amazon S3 file).

Aggregators (element 126)/Transformers (element 124)/Filters (element 122): Stages for performing specific aggregations, e.g., a stage that counts or sums fields, a stage that performs statistical analysis, a stage that sorts, a stage that filters, etc.

Output (element 128): Similar to sources, a stage for placing the output data in the appropriate location (e.g., a database, a file, etc) in the correct format.

Other components may also be necessary for moving data through the pipeline of stages. Some of these other components may include:

Processing environment (element 107): This comprises a set of potentially distributed compute resources (comprising processing elements) and storage resources. The components are usually connected with a high-speed network and utilizing a distributed file system. Illustrative examples include: Hadoop w/HDFS, Amazon Elastic Map Reduce w/S3, etc. The compute nodes (e.g., elements 130, 134 and 138) may be physical or virtual (i.e. state machines). Customization of the hardware compute and storage infrastructure is also possible. Typically, the ratio between CPU/memory/disk can be tailored to the types of stages running on each node.

Processing Elements: These elements perform an action or set of actions on the data to manipulate it in some way. There may be one or more processing elements residing on a compute node within the processing environment. In the illustrative example shown in FIG. 1B, compute node 1 has a source stage 132, compute node 2 has a combined filter and breakdown stage 136, and compute node 3 has an aggregation stage 140 and a data output stage 142. There may also be hardware tailored for specific process elements. E.g., elements performing large parallel operations may make use of parallel GPU hardware. Other examples include hardware for performing large out-of-core sorting including large memory configurations, flash-based/non-volatile storage accelerators or caches, and other hardware accelerators (e.g., FPGA based add-on cards).

Scheduler: These are responsible for determining which stage should be run when where. If a workflow is periodic, the scheduler is responsible for running the workflow with the correct periodicity. The scheduler must also make sure any dependencies between stages are met (e.g., if data is to be joined from multiple previous stages, both previous stages must have first completed). The scheduler may also make decisions as to which node and processing element runs a specific stage. The processing environment may contain multiple distributed nodes with varying CPU/memory/storage utilization which may all factor into the scheduler's decisions.

Source caches: For data that typically resides remotely, some amount of source data may be cached locally to improve performance. This is especially useful for static database sources where temporal event data is being joined with a subset of the static source data. Source caches may utilize different storage hardware to accelerate their performance. Flash or other non-volatile caches may be utilized, as well, and large amounts of memory may be used by the caches. Cache performance can be tuned via various types of policies (including replacement, cache layout, etc).

As part of the provenance tracking scheme, metadata is extracted as the workflow is processed. Non-limiting illustrative examples of two primary types of metadata are:

Data schemas: These include descriptions of the source data schemas (the structure of the data including attribute names and types). Schemas are useful for understanding the type of data being processed. Since each transformation/aggregation/filter can modify the source data schema, the schema of the data as it is processed at each stage in the workflow can also be maintained.

Workflow provenance: This includes the steps the data goes through as it is being processed. Workflow provenance includes metadata indicating where the data came from (e.g., the source database or file), which processing stages have the data gone through, what types of transformations have been applied on the data, etc. Provenance may also include information on the particular user(s) that ran workflow and created the data sources.

Figure 4:
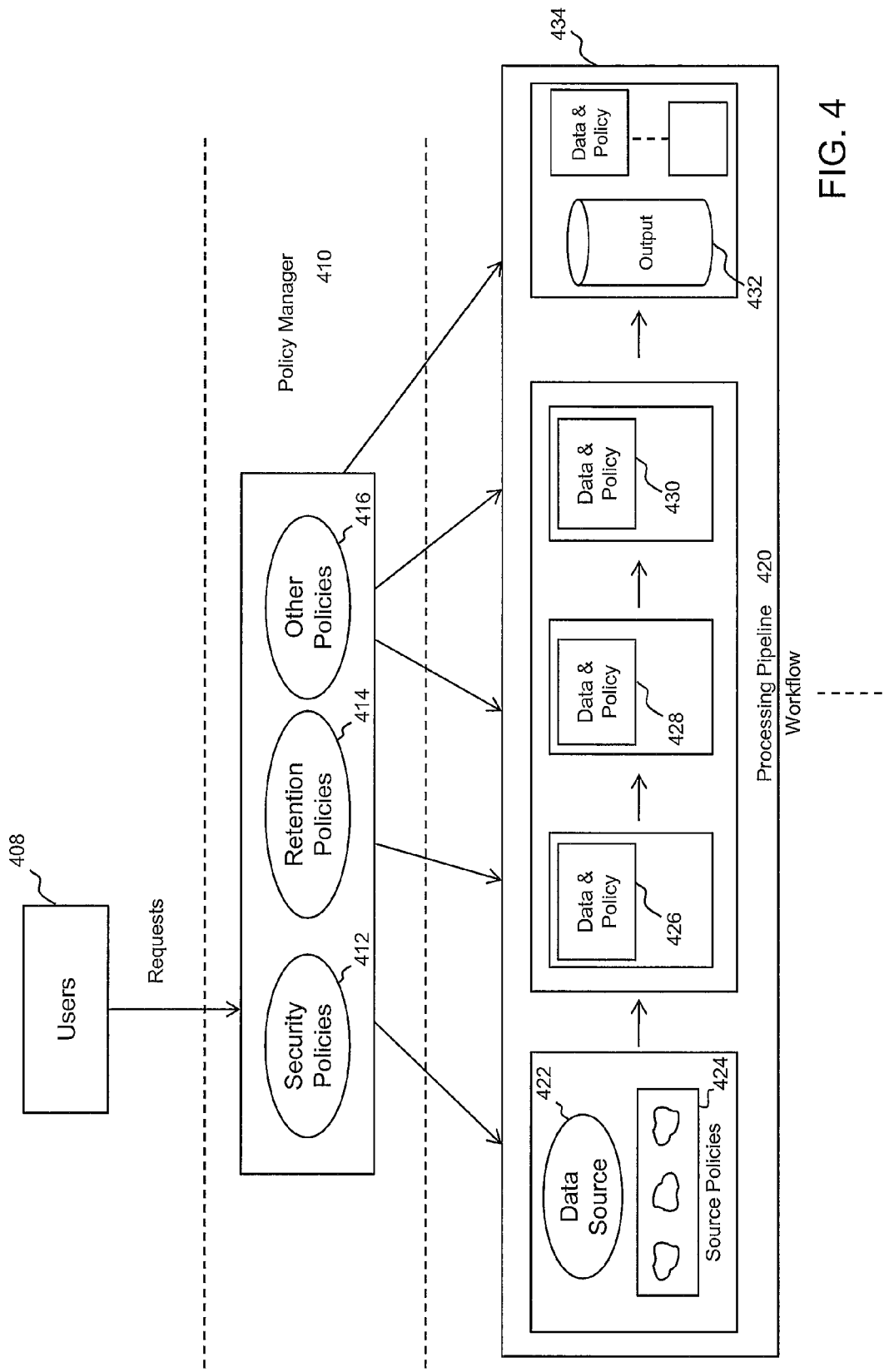
FIG. 4 depicts provenance-driven policy implementation, according to an embodiments of the present disclosure.
Figure 5:
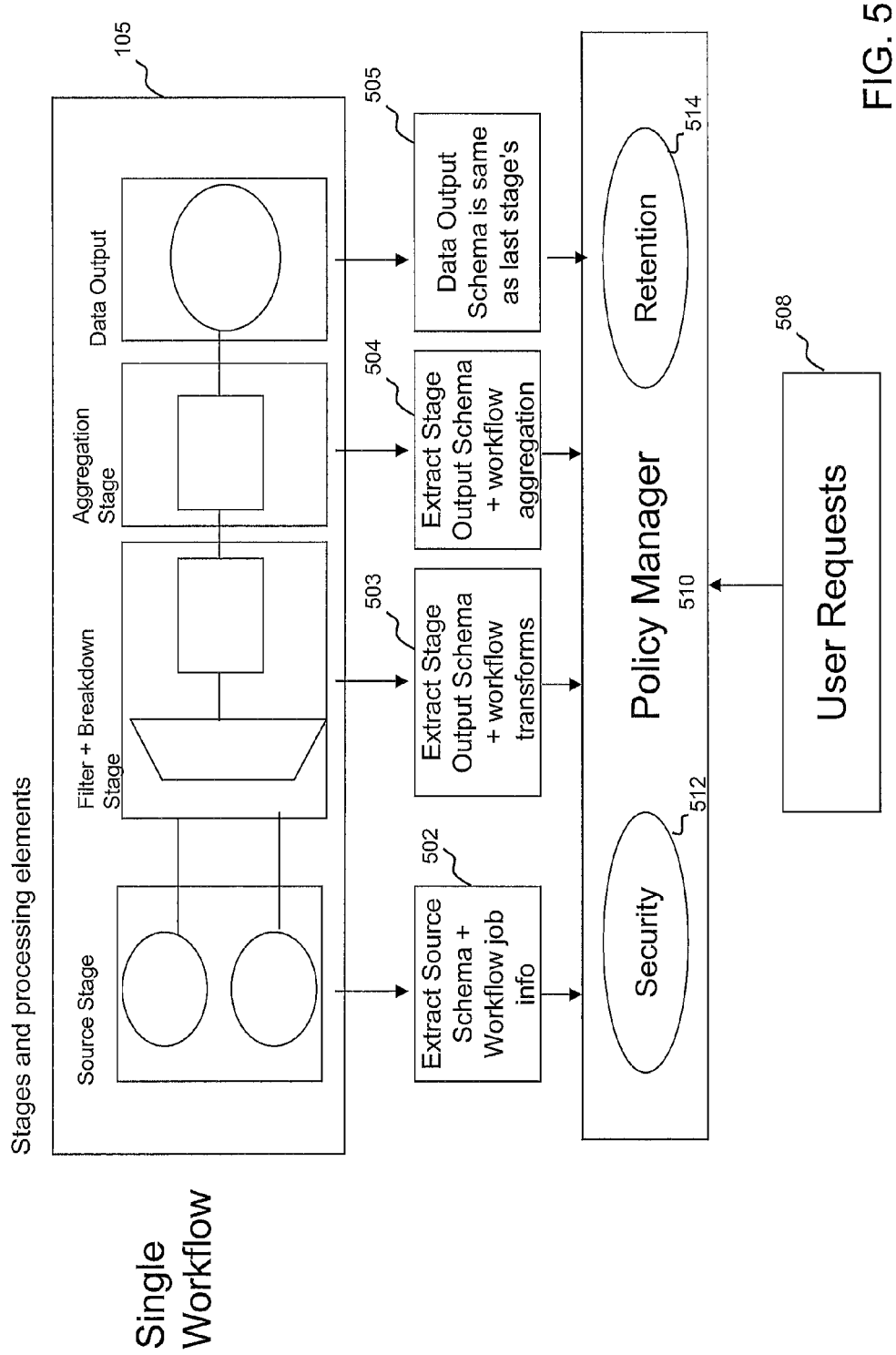
FIG. 5 depicts integration of policies into workflow management process flow, according to an embodiments of the present disclosure.

The extracted metadata is useful for determining/enacting policies on the data. Some exemplary policies include, but are not limited to: data security, and data retention policies, as shown in FIGS. 4 and 5. For example, by placing a security policy on the data source, security can be enforced on all output and intermediate data. Similarly, by placing a specific retention policy on the source data, the policy can be enforced and/or updated on all derivative data. Metadata is also useful for auditing purposes (e.g., tracking who has been working with which pieces of data).

To summarize, embodiments of this present disclosure describe techniques for implementing a near-real-time processing system for the workflow-processing environment as described above, and described further subsequently.

Figure 2:
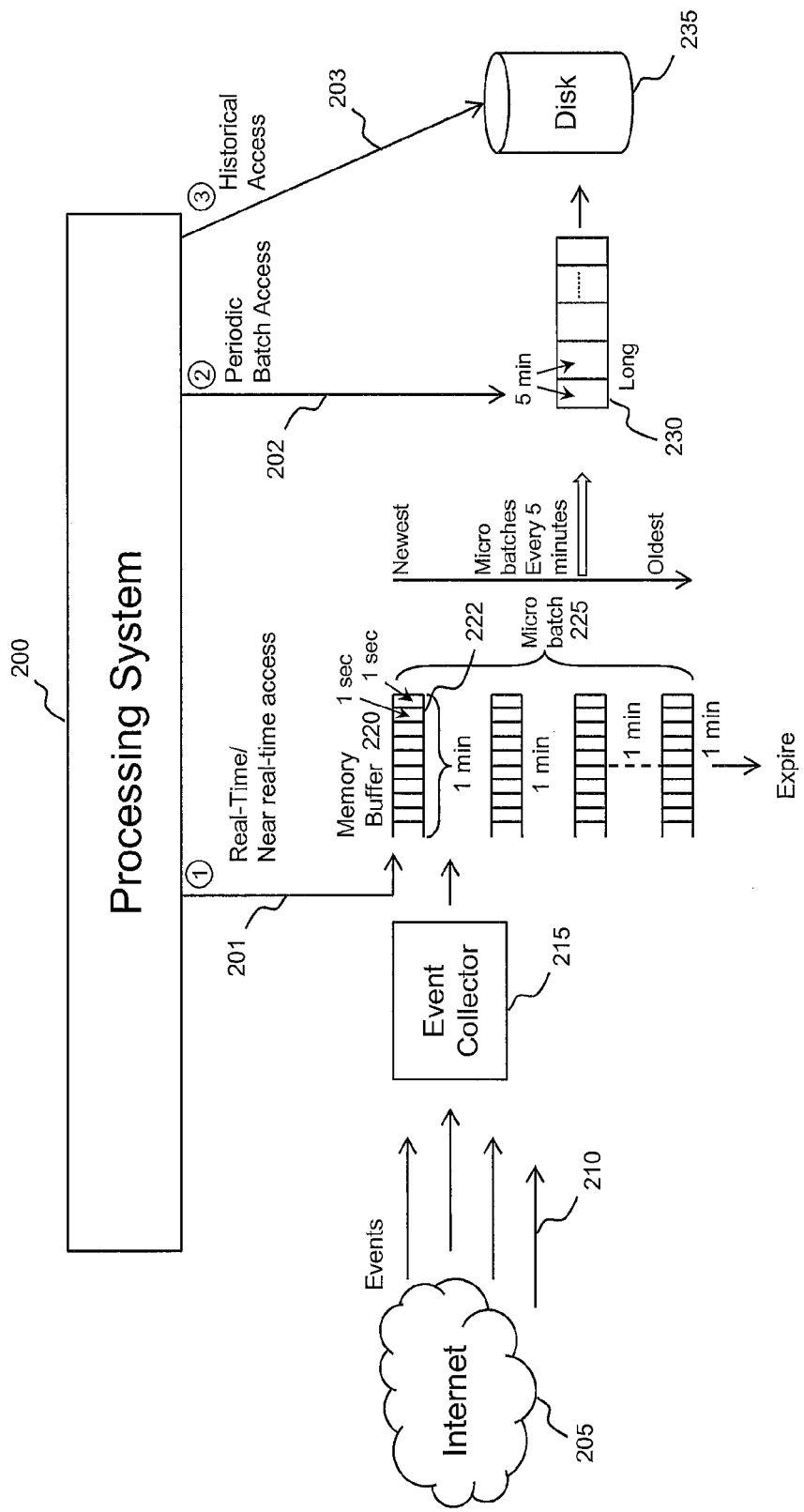
FIG. 2 depicts an illustrative embodiment of a micro-batching system, according to an embodiments of the present disclosure.

The data analytics platform is designed to provide a combination of near-real-time event processing and historical event batch processing within a single framework. It achieves this by, among other things, collecting events into "micro-batches" which can be individually processed and then collected together into a larger batch for use at a courser granularity of processing. This processing and re-batching procedure can be recursively applied, allowing for processing of micro-batches at near-real-time speeds while still accommodating traditional historical batch processing techniques. FIG. 2 shows different components of process flow including micro-batching. The processing system 200 (i.e. the data processing layer of the overall workflow management framework/platform) shown in FIG. 2 is enables to do at least the following: 1) real-time or near-real time data access (indicated by the arrow 201); 2) periodic batch access (indicated by the arrow 201); and 3) historical access (indicated by the arrow 203).

Because of the recursive capabilities of the processing layer, a single processing definition can be used for any/all of the processing layers. Users of the system do not need to write different processing definitions for their real-time and historical analyses. Batch granularities are configurable, and event batch boundaries are specified by event arrival time or other predefined criteria. Events can be collected by an event collector 215 independently on same or separate compute nodes and the processing layer will determine when/where processing is to be applied. In FIG. 2, events 210 may be collected from the Internet 205. Events may be collected from other public/semi-private/private networks/servers/devices too.

The "granulated batching" is implemented by leveraging in-memory processing for micro-batches, while logging all incoming events into larger batches on-disk, i.e. stored batches. As events 210 arrive, they are placed into a memory buffer 220 that fills out to the smallest granularity 222 of update processing (e.g., one second). Memory buffers may be configured to sequentially collect up to a finite temporal length of events (e.g. 1 minute in each sequence). Once full, the memory buffer is then collected into an array of buffers that form a micro-batch containing data over the most recent micro-batch period (e.g., 5 minutes). When a new memory buffer is appended to the micro-batch, the oldest memory buffer in the micro-batch is expired from the logical batch. A pointer to the memory buffer is also kept in a disk-flushing queue, which continuously issues disk writes to write events into historical batches on stable storage. The flushing may be controlled by an event sync module. Once a memory buffer is expired both from the micro-batch and from the disk-flush queue, it can be freed for re-use. The time granularity of historical batches is configurable (e.g., one hour). Historical batches also maintain internal pointers to identify the set of micro-batches that form a historical batch (e.g., 5 minute intervals, as shown in periodic batch access memory buffer 230). Persons skilled in the art will readily understand that the example time intervals are non-limiting illustrative example, and can be varies according to what is desired by the user/system. Disk 235 indicates data available in the storage layer, as further described with reference to FIG. 3.

Data processing may occur based on the fastest access path for the data being requested. For recent data exploration, the user may have direct access to the in-memory micro-batches from one or more machines, allowing low-latency exploration. For periodic aggregations, data is computed either dynamically or upon batch completion, or a combination thereof, depending on the requirements of the aggregation. For independent aggregations, the aggregation values can be updated dynamically by computing differences on them as memory buffers are added/removed from a micro-batch, and then can be updated recursively as smaller batches are added to larger. For example, the system calculates a summation (which is independent) by removing the sum of the values in an expiring memory buffer and adding the sum of the values in the new memory buffer. Conversely, the system calculates unique counts upon batch completion, since the results are dependent upon all of the values in the batch.

The implementation of more complex transforms may be achieved using a variety of different mechanisms, including, but not limited to: traditional database-style processing (where batches are "tables" and the schema is defined based on the schema extracted from the data), map-reduce style processing, distributed MPP-style processing, etc. The sequence and/or use of type mechanisms are configurable. For example, initially, the system may implement a map-reduce-style processing framework in which aggregations can be specified, in addition to a specification for dynamic batch updates.

As described above, embodiments of this disclosure describe a technique for collecting and tracking provenance metadata for use in policy management/improvement. The user can extract provenance information at near-real-time by attaching the data-origin to micro-batches and tracking them through data processing stages and result output. One of the unique features of the disclosure is a processing specification layer over a batch event processing system that automatically collects provenance and schema metadata from the data stored in the system. One manner in which this metadata is used is to track the provenance of data as it flows through the system. The provenance and schema information that is collected can be used to implement complex data management policies.

Figure 3:
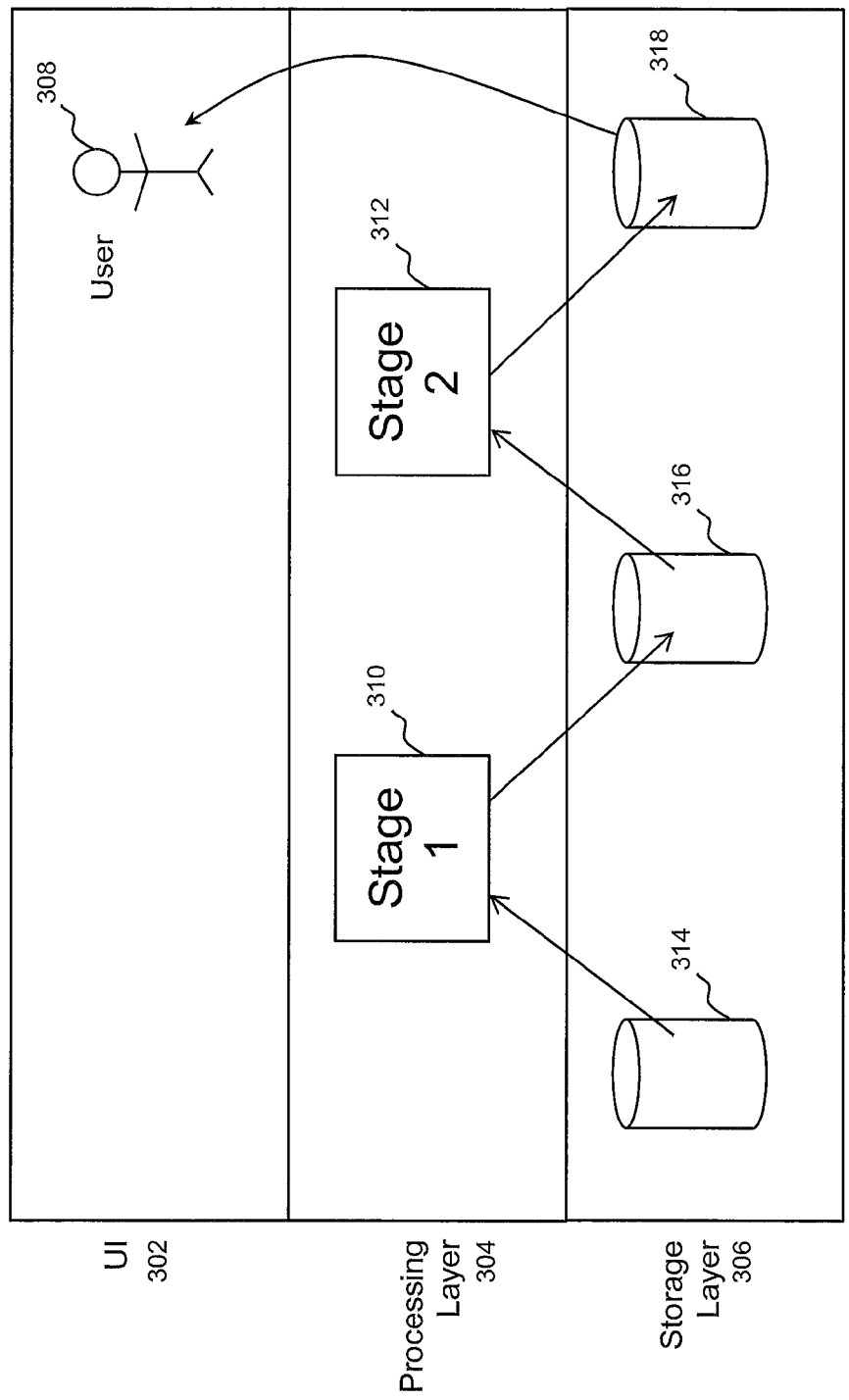
FIG. 3 shows an illustration of provenance tracking for data through various stages of journey, according to embodiments of the present disclosure.

As shown in FIG. 3, the collection of provenance in the system of the present disclosure integrates metadata collected at a variety of application layers: storage layer 306, processing layer 304, and UI layer 302. Unlike most existing provenance tracking systems that collect information at a single layer, the integration of data from these layers provides a much richer and more accurate view of provenance.

From the storage layer 306 metadata is collected from the disks 314, 316 and 318. These disks may be similar to the disk 235 shown in FIG. 2. Content of metadata may include where data physically resides, its characteristics (e.g., internal formats, size, access logs, etc.), the data owner, and so forth. Metadata collected from the processing layer may include what transformations are being performed at what stages (i.e. stages 1 and 2, indicated by elements 310 and 312 respectively), the relationships of the input and output data (such as which data attributes from the input data are used to generate an attribute of the output data), the user who requested the transform, and so forth. Finally, from the UI layer, it is possible to track who is seeing the data, i.e. UI layer 302 provides information about the user 308. The integration of these layers provide opportunities to place a security policy on a data source in the storage layer, and ensure that policy is maintained across multiple transforms and up through the UI layer. Similarly, it is possible to audit accesses and tie them back to sources, limit views at the UI based on policy, enforce retention guarantees from a source through to the derived data, and so forth, as shown in FIGS. 4 and 5.

Embodiments of the present disclosure operate by taking in workflow definitions that are based on logical data processing. As shown in FIG. 4, workflow comprises a set of stages, which are logical components in a pipeline 420 of data processing. The present disclosure compiles this set of stages into a set of batch processing operations. The initial inputs of the batch processing are based on the specified data sources 422 for the workflow. There may be various source policies 424 associated with the data sources. The outputs of the batch processing are chosen by our system, which sets the data sources as ancestors of the output data. In the case where a data sources contain structured or semi-structured data (e.g., a database or JSON file), then the provenance can include fine-grained schema information comprising individual columns or attributes of the data source. The outputs of workflows can then become data sources for downstream workflows. Various stage-specific policies 426, 428 and 430 may be dynamically applied as data flows downstream along the pipeline. Further policies 434 may be applied to the output 432 at the end of the pipeline.

The various policies are generated and/or managed by a policy manager layer 410, that may have security policies 412, retention policies 414, and/or other policies 416. At least some of the policies may be dictated/updated/improved by incorporating requests received from users 408.

As mentioned above, provenance and schema information are collected by each stage of the workflow, thus continually or periodically tracking the data as it moves through the system. This information contains valuable information as to the type of transformations the data went through as it flows through the system. The collection of this information can be done regardless of the processing environment used for workflow processing. For example, in the case of a map-reduce environment, each job's input and output can be tracked and tied to the workflow. In the case of a near-real-time processing environment, provenance metadata is tracked continuously as micro-batches are formed, processed, and stored. In FIG. 5, steps 502, 503, 504 and 505 indicate provenance/metadata collected from different stages of data processing, mapped to different processing elements shown in the compiler 105.

This provenance data allows for complex data management policies to be attached to the data and transferred with the data as it flows downstream. For example, a data retention policy 514 placed on a data source can be attached to any data generated from that source and automatically applied at all ancestors (or stages) that handle or store intermediate data generated from that source, even if the data is transformed or merged with additional data from other sources. This can then be acted upon by a policy manager 510, which can automatically migrate, delete, replicate, compress, or otherwise manipulate a data's form or storage location. Another common example involves fine-grained security 512. Access-control that is specified on a database column can be automatically applied to ancestors that rely on data from that column. Because data is accessed through our APIs, the system can audit all uses of the data and prevent unauthorized accesses. The provenance, combined with understanding of the transforms applied to the data, can also be used to de-classify data. For example, if an aggregation is done across a wide range of classified values, a policy could be specified indicating that the resulting output value is now de-classified and could be made available to a wider range of users. Policy manager 510 has the capability of incorporating user requests 508 in creating/updating policies.

The schema information that is generated at each stage can serve as a central metadata repository that describes that type of data that exists with the system. With existing batch based systems it is often impossible to know exactly what data resides in the system even if it came from structured data sources. Since the provenance of the data is tracked, including the structure at the source as well as the transformation along the way, it is possible to know exactly what type of data resides in the system, including when it was generated, by whom, and where it came from.

The platform of the present disclosure empowers analysts to work directly with available data. Data can be semi-structured, structured, unstructured. Data may be characterized by volume, velocity, variety or other user-determined criteria/category. The platform enables, among other things, the following functionalities, without needing the user to have the expertise to write specific codes, and/or requiring the user to host or manage infrastructure:

Combine new and existing sources of data to get comprehensive insights from all available data;
   Condense vast amounts of data to expose key characteristics;
   Customize analytics workflows for user's specific case through easy-to-use graphical user interface;
   Keep analysis results up-to-date as new data arrives, with automated updates to event reports/event logs.

Micro-batching could be useful in a variety of applications that need more immediate feedback. Examples include, but are not limited to, manufacturing lines, monitoring systems, reactive A/B testing, etc. Micro-batching could also be useful in cases where large enough volumes of data are collected that large batch jobs are impractical unless certain characteristics of the data are present, in which case micro-batches could help identify such characteristics and then initiate larger batch processing.

FIG. 6A shows a web analytics use case as an illustrative example. A workflow comprises two input sources 602 and 604 where one input source 602 is an event stream generated by user clicks within a web application and the second input source 604 is a database consisting of user demographic information (e.g., a CRM database). The workflow combines the event stream with the user demographic database and breaks down the event stream by user demographics (e.g., by gender and/or age) in step 606. For each demographic group aggregations are computed in steps 608 that count the number of pages viewed and the number of unique users for each population segment (step 610). The output is stored in a database (step 612).

FIG. 6B shows a retail use case as an illustrative example. A workflow comprises two input sources where one input source 614 is an event stream of purchases generated by point of sale terminals and the second input source 616 is a database consisting of customer demographic information. The workflow combines the event stream with the customer demographic database and breaks down the event stream by user demographics (e.g., by gender and/or age) as shown in step 618. For each demographic group aggregations are computed (step 620) that count the purchase amounts as well as the most popular items purchased (step 622). The output is stored in a database (step 624).

FIG. 6C shows an utilities smart meter use case as an illustrative example A workflow consisting of two input sources where one input source 626 is an event stream of sensor data generated by home utility monitors and the second input source 628 is a database consisting of customer demographic information. The workflow combines the event stream with the customer demographic database and breaks down the event stream by user demographics (e.g., by gender and/or age and/or address), as shown in step 630. For each demographic group aggregations are computed for neighborhood usage (e.g., within some zipcode), as shown in step 632, and counts the usage per demographic group, as shown in step 634. The output is stored in a database (step 636).

The illustrative examples shown in FIGS. 6A-6B are just some of the example application areas where the analytics methods of the present disclosure can be used.

Throughout the foregoing description, for the purposes of explanation, numerous specific details were set forth in order to provide a thorough understanding of the disclosure. It will be apparent, however, to one skilled in the art that the disclosure may be practiced without some of these specific details. Although various embodiments which incorporate the teachings of the present description have been shown and described in detail herein, those skilled in the art can readily devise many other varied embodiments that still incorporate these techniques. For example, embodiments of may include various operations as set forth above, or fewer or more operations; or operations in an order different from the order described herein. Further, in foregoing discussion, various components were described as hardware, software, firmware, or combination thereof. In one example, the software or firmware may include processor-executable instructions stored in physical memory and the hardware may include a processor for executing those instructions. Thus, certain elements operating on the same device may share a common processor and common memory. Accordingly, the scope and spirit of the disclosure should be judged in terms of the claims which follow as well as the legal equivalents thereof.

What is claimed is:

1. A data manipulation system executed on a computer, the system being for combining near-real-time data and batch data to be processed by a data processing layer executed in the computer's processing environment and using the computer's memory system, the data manipulation system comprising:
    an event collector module that, when executed on the computer, collects incoming event data in real-time;
    a hierarchical processing layer executed in the computer's processing environment, the processing layer comprising a plurality of processing sub-layers, each processing sub-layer processing one or more data micro-batches stored at respective corresponding levels of temporal granularity;
    a processing daemon executed in the computer's processing environment, the processing daemon applying a single processing definition to the data micro-batches at the plurality of processing sub-layers, generating and storing resulting processed data micro-batches at the respective corresponding levels of temporal granularity; and
    a data buffering control module sending commands to the computer's memory system, the data buffering control module shifting processed data micro-batches together to a next coarser level of temporal granularity, wherein aggregation of the processed data micro-batches constitute batch data.

2. The system of claim 1, wherein the levels of temporal granularity are individually configurable.

3. The system of claim 1, wherein increasing levels of temporal granularity match with increasing latency of corresponding storage layers.

4. The system of claim 3, wherein the latency comprises two levels, the first level of latency corresponding to the computer's transient memory, and the second level of latency corresponding to the computer's long-term storage memory.

5. The system of claim 3, wherein the latency comprises three levels, the first level of latency corresponding to the computer's transient memory, the second level of latency corresponding to the computer's flash memory, and the third level of latency corresponding to the computer's long-term storage memory.

6. The system of claim 1, wherein data comprises raw data, structured data, unstructured data, semi-structured data, or a combination thereof.

7. The system of claim 1, wherein the data micro-batches contain provenance information.

8. The system of claim 7, wherein the provenance information comprises one or more of: a processing location of a data micro-batch, a storage location of a data micro-batch, a type of processing operation applied to a data micro-batch, users who have viewed a data micro-batch, and users who have defined the type of processing operation being applied to a data micro-batch.

9. The system of claim 7, wherein provenance information is used to apply data manipulation policy.

10. The system of claim 9, wherein the data manipulation policy is applied to one or more of a micro-batch of data, an aggregation of micro-batches of data, and, data generated as a result of the processing daemon acting on a batch of data.

11. The system of claim 1, wherein a micro-batch of data comprises buffered data for events collected over a one second period.

12. The system of claim 1, wherein the coarser levels of temporal granularity comprise three distinct levels: one minute, five minutes, and 60 minutes.

13. The system of claim 1, where each memory buffer forming the micro-batch contains 1 minute length of data sequence.

14. The system of claim 1, wherein the data buffering control module includes an event sync module that shifts batches of data from a finer temporal granularity level to coarser temporal granularity level once the batch of data is processed, allowing resources at the finer temporal granularity level to be freed for re-use after a pre-determined expiration period.

15. The system of claim 1, wherein data processing is performed on-demand.

16. The system of claim 1, wherein data processing is performed on the fastest access path for the data being requested.

17. The system of claim 1, wherein a user has access to one or both of: data stored in a micro-batch, and, data generated as a result of the processing daemon acting on a batch of data.

18. A computer-implemented method for combining near-real-time data and batch data to be processed by a data processing layer executed in the computer's processing environment and using the computer's memory system, the method comprising:
    collecting incoming event data in real-time by an event collector module executed on the computer;
    storing one or more micro-batched of data at respective corresponding levels of temporal granularity to be processed at different sub-layers of a hierarchical processing layer executed in the computer's processing environment;
    applying a single processing definition to the data micro-batches at the plurality of processing sub-layers by a processing daemon executed in the computer's processing environment;

generating and storing resulting processed data micro-batches at the respective corresponding levels of temporal granularity in the computer's memory system;

shifting processed data micro-batches together to a next coarser level of temporal granularity in response to commands issued by a data buffering module coupled to the computer's memory system; and aggregating the processed data micro-batches to constitute batch data to be processed by the hierarchical processing layer executed in the computer's processing environment.

19. The method of claim 18, wherein the method further comprises:

individually configuring the levels of temporal granularity.

20. The method of claim 18, wherein the method further comprises:

tracking provenance information as collected data are stored and progressively processed by the hierarchical processing layer.

21. The method of claim 20, wherein the method further comprises:

using the provenance information to update data manipulation policies.

22. A non-transitory computer-readable storage medium having computer-executable instructions stored therein for causing a computer to perform a method for combining near-real-time data and batch data to be processed by a single data processing layer, the method being executed in the computer's processing environment and using the computer's memory system, the method comprising:

collecting incoming event data in real-time by an event collector module executed on the computer;

storing one or more micro-batched of data at respective corresponding levels of temporal granularity to be processed at different sub-layers of a hierarchical processing layer executed in the computer's processing environment;

applying a single processing definition to the data micro-batches at the plurality of processing sub-layers by a processing daemon executed in the computer's processing environment;

generating and storing resulting processed data micro-batches at the respective corresponding levels of temporal granularity in the computer's memory system;

shifting processed data micro-batches together to a next coarser level of temporal granularity in response to commands issued by a data buffering module coupled to the computer's memory system; and aggregating the processed data micro-batches to constitute batch data to be processed by the hierarchical processing layer executed in the computer's processing environment.

\* \* \* \* \*